Feb. 25, 1930.    S. N. ARNOLD    1,748,099
TUBE CUTTER
Filed May 31, 1928    2 Sheets-Sheet 1
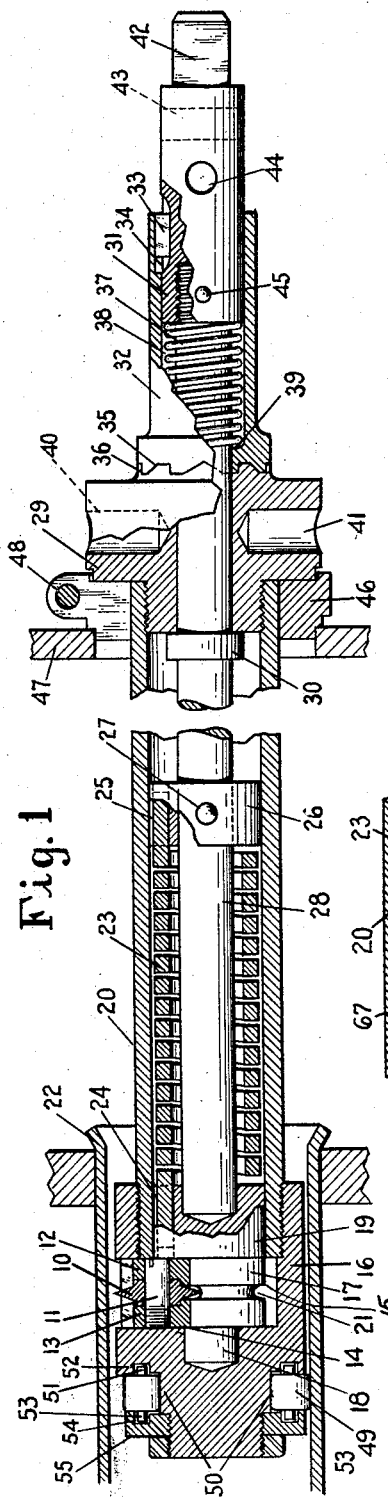
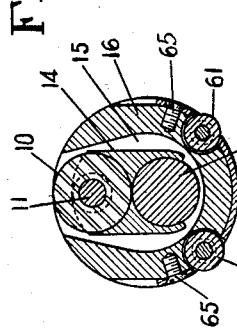
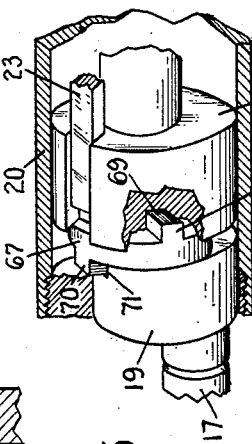
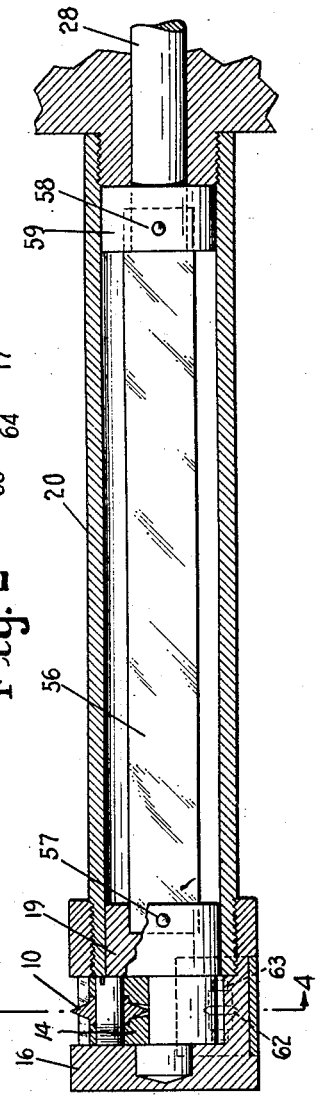
Inventor
STANFIELD N. ARNOLD
By his Attorney Feb. 25, 1930.      S. N. ARNOLD      1,748,099
TUBE CUTTER
Filed May 31, 1928      2 Sheets-Sheet 2

Inventor
STANFIELD N. ARNOLD
By his Attorney

Patented Feb. 25, 1930

1,748,099

UNITED STATES PATENT OFFICE

STANFIELD N. ARNOLD, OF NEW YORK, N. Y.

TUBE CUTTER

Application filed May 31, 1928. Serial No. 281,697.

My invention relates to a tube cutter for cutting tubes of boilers, condensers and similar apparatus either for removal and replacement, or for trimming the ends of the tubes after being mounted.

Owing to the restrictions in and about the outside of tubes and boilers and other heating appliances, if a tube is to be cut while in position in the apparatus, it cannot be cut from its outer surface, but must be cut from its interior. Heretofore, cutters for this purpose have been constructed with a number of cutting wheels, usually three in number, which are advanced in a step by step manner by means of a positive forcing mechanism. This construction required considerable space for the cutting wheels and, therefore, limited the use of such cutters to tubes of relatively large diameter. Moreover, the positive and definite advancement of the cutting wheels at intervals, put a strain on the wheels as they were forced into the metal of the tube and, at times, tended to injure both the cutting wheels and the tube being cut.

These disadvantages are obviated in my invention, among the objects of which are to provide a tube cutter capable of use in tubes of small diameter; to provide a tube cutter that imposes a continuous, uniform cutting pressure and a gradual, continuous advance of the cutter into the tube wall; to provide a cutter disc advancing mechanism that automatically advances the cutting edge as the depth of the cut increases; to provide a cutter mechanism that enables a single advancing cutting disc to be used; and to provide a cutter mechanism that may be inserted in tubes not in alignment with the driving mechanism, and in which the cutting disc or element may be released and brought into cutting position after being placed in the tube to be cut.

Further objects and features of my invention are to provide cutter supporting rolls that spread and widen the cut and thus facilitate the action of the cutter edge; to provide a single point supporting roller contact; to provide a compact and effective spring mechanism for pressing a cutting roller into the tube and for releasing the spring; and to provide an eccentric cutter actuating means for advancing the cutting tool against the inner surface of the tube to be cut.

With these and other objects in view, the invention comprises the tube cutter described and set forth in the following specification and claims.

The various features of the invention are shown in the accompanying drawings, in which:

Fig. 1 is a longitudinal sectional view of a tube cutter embodying a preferred form of the invention, and showing the position of the cutter in a tube to be cut.

Fig. 2 is a longitudinal sectional view of a modified form of tube cutter.

Fig. 3 is a perspective view of a modified construction for actuating a cutter advancing mechanism centered eccentrically of the axis of the cutter.

Fig. 4 is a cross section of the tube cutter taken on the line 2—2 of Fig. 2.

Figure 6:
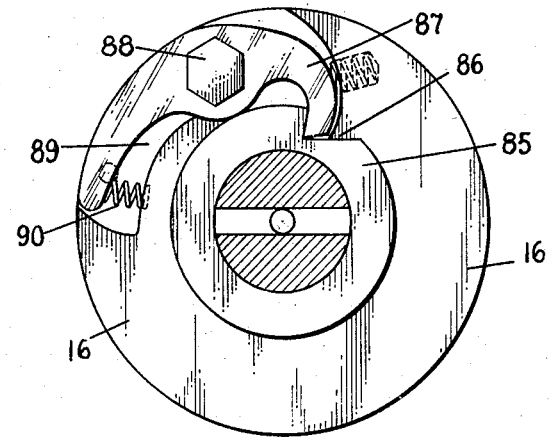
Fig. 6 is a cross sectional view, on an enlarged scale, of the tube cutter of Fig. 5, taken on line 6—6.

In my present invention a cutting disc is mounted in a supporting head which may be placed at the desired position within the tube to be cut, and is rotated with the supporting head during the cutting of the tube. The cutting disc is so supported within the cutting head by a driving eccentric that it may be pressed outwardly against the inner surface of the tube. A continuous cutting pressure is imparted to the cutting disc by means of a spring under tension which causes the disc to continuously press into the wall with a substantially constant pressure as the cutting progresses.

Referring more particularly to Fig. 1 of the accompanying drawings, the cutting disc 10 is journaled on a shaft 11 carried between arms 12 and 13 of a bifurcated carriage 14.

The carriage 14 is guided in a recess 15 of a cutter head 16 so that it may slide inwardly and outwardly in said recess. The inner end of the carriage 14 engages an eccentric 17 carried at one side by a small trunnion 18 journaled in the head 16 and, at the other side, by a larger trunnion 19 journaled in the inner end of a driving sleeve 20. To economize in space, the eccentric 17 is provided with a circumferential groove 21 which receives the edge portion of the disc 10.

In the position shown in Fig. 1, the disc 10 and carriage 14 are drawn inwardly within the cutter head. As the trunnions 18 and 19 are rotated, the eccentric 17 carries the carriage 14 and disc 10 outwardly of the cutter head and into contact with the inner surface of a tube 22 to be cut. The continued rotation of the trunnions 18 and 19 causes the cutter 10 to enter more deeply into the tube 22 until a rotation of 180° has been reached, whereupon further rotation causes the cutter to be withdrawn into the cutter head.

In use, the cutter head is placed within the tube 22 and so positioned that the cutter 10 is at the point where the tube is to be cut. A torsional stress is then put upon the trunnion 19 by means of a helical spring 23, one end of which enters a groove or key-way 24 in the trunnion 19, and the other end of which enters a corresponding groove or key-way 25 in a disc or collar 26 which may be rotated within the sleeve 20 to wind up the spring 23 and place it under tension. The torsional stress thus placed on the trunnion 19 causes it to rotate until the cutter 10 comes into contact with the inner surface of the tube 22 and rests against the tube wall with a pressure determined by the tension of the spring 23. The driving sleeve 20 is then rotated, causing the cutter head 16 to rotate and carry the cutter disc 10 in a circle about the inner surface of the tube 22. The continuous rotation of the cutter disc 10 causes it to score and penetrate the inner surface of the tube. The rotation of the cutter head and disc and the continuous outward pressure applied by the spring 23 on the disc, causes its penetration to increase until it completely severs the tube.

To put the spring 23 under tension, the collar 26 is keyed, by means of a pin 27, to and rotated by, a mandrel 28, one end of which is journaled in a suitable recess in the trunnion 19, and the other end of which projects through, and is journaled in, a ratchet head 29 mounted in the outer end of the sleeve 20. Longitudinal movement of the mandrel 28 is prevented by means of a sleeve 30 which bears against the inner end of the ratchet head 29. The outer, projecting end of the mandrel 28 is threaded into a turning head 31, the inner portion of which is enclosed by a ratchet handle 32 slidable on the turning head and on the mandrel 28. The ratchet handle 32 is slidable on the turning head 31, but is keyed against rotational movement relative thereto by means of a key 33 fixed in a key-way on the turning head and projecting into a key-way 34 of the ratchet handle. It will thus be evident that the ratchet handle may be moved longitudinally of the turning head 31, and that the turning head will rotate with the rotation of the ratchet handle. The inner end of the ratchet handle 32 is provided with a number of saw teeth projections 35, which engage corresponding saw teeth depressions 36 in the ratchet head 29. To maintain the teeth 35 and 36 in engagement, the ratchet handle 32 is normally urged towards the ratchet head 29 by means of a helical spring 37 within the recess 38 of the ratchet head 32, which encircles the mandrel 28 and presses, at one end, against the turning head 31 and, at the other end, against the inturned end 39 of the recess 38.

After the cutter head 16 and the supporting and driving sleeve 20 have been properly positioned for the cut to be made, the tensioning collar 26 is given the required rotation relative to the sleeve 20, by drawing the ratchet handle 32 outwardly against the pressure of the spring 37 until the ratchet teeth 35 and 36 are disengaged, and in then turning the ratchet head 32 with a left hand or counter-clockwise movement relative to the ratchet head 29, until the rotation of the mandrel 28 and collar 26 place the required tension on the spring 23. Thereupon, the ratchet head 32 is released and the spring 37 presses the ratchet teeth 35 and 36 into engagement. The ratchet head 29 is prevented from turning when the ratchet handle 32 is drawn upwardly and turned by means of handles, not shown, that may be inserted into recesses 40 and 41 in the ratchet head.

The sleeve 20 may be rotated by means of a torsional stress applied to a squared end 42 of the turning head 31 or, the head may be turned by means of bars passed through transverse openings 43 and 44. To prevent turning and unthreading of the turning head 31 from the mandrel 28, a transverse locking pin 45 may be driven through the threaded portions of the turning head and mandrel.

The cutting head and driving collar 20 may be held in their positions in the tube 22 by means of a split ring 46 encircling the outer portion of the sleeve 20, and adapted to be slid to position against a hand-hole sheet 47, and tightened in position on the sleeve 20 by means of a thumbscrew 48.

The reaction or back thrust of the cutting disc 10 on the cutter head 16 is supported on the wall of the tube 22 by means of a number of rollers 49 about a shaft surface 50 at the free end of the cutter head. The rollers 49 are held in position by means of end pins 51 which project into an annular recess 52 on the head 16, and pins 53 which project into a similar annular recess 54 in an end collar 55 which is threaded onto the end of the cutter head. The shaft surface 50 may be concentric with the axis of the cutter head so that the rollers 49 contact throughout the entire surface of the tube but, inasmuch as the pressure is exerted only at the point diametrically opposite from the cutter 10, the shaft surface 50 is eccentric and is placed somewhat away from the cutter disc 10, so that the rollers 49 contact with the inner wall of the tube only at a point diametrically opposite from that of the cutter disc.

In the modification shown in Fig. 2, the cutter disc 10, carriage 14 and cutter head 16 are arranged in the same relation to the driving tube 20 as in the embodiment shown in Fig. 1. However, in these modifications, the mandrel 28 does not extend to the trunnion 19 and, instead of the helical spring 23, a flat laminated spring 56 is fastened or pinned at one end to the journal 19 by means of a pin 57 and, by means of a pin 58 at its other end, is secured to a disc 59, which is also pinned to the end of the mandrel 28. The turning of the mandrel 28 relative to the collar 20, therefore, serves to put the spring 56 under torsional stress which transmits the required tortional stress to the journal 19 and causes the cutter 10 to press into the inner surface of the tube 22.

In these modifications, shown in Figs. 2 and 4, also a different type of thrust rollers 60 and 61 are provided and are mounted in substantially the same zone as the cutting disc 10. The thrust rollers 60 and 61 are provided with a wedge-shaped ridge 62 which is in a plane with the cutting disc 10 at a right angle to the axis of the cutting head. The ridges 62 have a more blunt or obtuse angle so that as they are pressed into the cut made by the cutter 10, they tend, in the manner of a wedge, to spread the groove thus formed and to widen it so that it does not have a tendency to grip the side edges of the cutter 10. A more effective cutting action is thus obtained and there is less likelihood of breakage of the hard cutting edge of the cutter. When the ridge 62 has entered to its maximum depth into the cut or groove, the cylindrical portions of the roller rest against the inner surface of the tube and thus receive the thrust and prevent an excessive wedging action. The rollers 60 and 61 are provided with end trunnions 63 which are mounted in bearings in a suitable recess in the cutter head 16, and are retained in position by means of a strap 64 secured at its ends in the cutter head by means of screws 65.

In the above described forms of the invention the trunnions 18 and 19 are centered on the axis of the cutter head 16 and tube 20. To enable a cutter head to be placed in a tube of very small diameter, it may be necessary, in order to mount a cutter disc of the required size in such a small space, to center the trunnions 18 and 19 eccentrically from the axis of the cutter head and diametrically opposite the axis of the cutter wheel, as is shown in Fig. 3. In this construction, the end of the spring 23 is not secured directly to the trunnion 19, but is secured to a disc 66 freely rotatable in the tube 20 and connected to the trunnion 19 by means of an Oldham coupling disc 67, having a key 68 on one face slidably engaging a groove 69 in the adjacent face of the disc 66, and having a key 70 at right angles to the key 68 on the opposite face of the disc and slidably engaging a keyway 71 on the adjacent face of the trunnion 19. As the disc 66 is rotated, the disc 67 rotates and slides to positions that enable it to transmit its rotating movement to the trunnion 19. The pressure of the spring 23, or of the spring 56 in case a flat spring is used, is thus transmitted to the eccentric trunnions 18 and 19.

Figure 5:
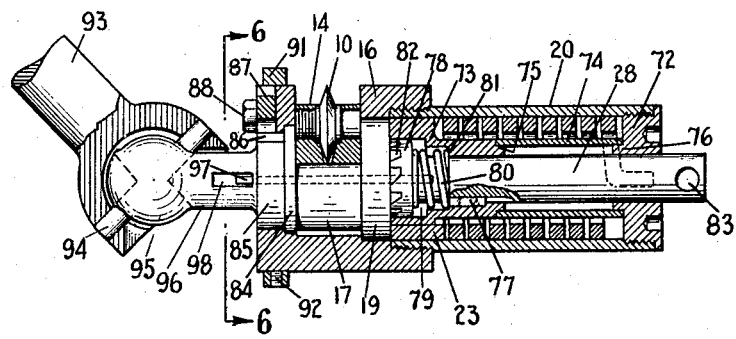
Fig. 5 is a longitudinal section of a modified form of tube cutter adapted to be driven through a universal joint from a drive out of alignment with the axis of the cutter.

The form of the invention shown in Figs. 5 and 6 is adapted for the cutting of a tube to which access cannot be had through an opening in direct alignment with the axis of the tube. It is also adapted for the cutting of tubes in which there is not much space between the line on which the tube is to be cut and an adjacent hand-hole having an opening out of alignment with the axis of the tube. In this form of the cutter, the arrangement of the cutter disc 10, cutter carriage 14 and eccentric 17 in the cutter head 16 is substantially the same as in the embodiments of Figs. 1 and 2. In this form of the invention, however, instead of anchoring one end of the spring 23 directly to the trunnion 19, and tightening the spring by rotating the outer end, as in Fig. 1, the outer end of the spring 23 is anchored and secured in position in a plate 72 which is threaded directly into internal screw-threads on the end of the sleeve 20, and the inner end of the spring 23 is anchored to a rotatable collar 73, which may be disengaged from the trunnion 19 when tightening the spring, and re-engaged by suitable clutch mechanism to drive the eccentric and the carriage cutter to cutting position. The collar 73 is held from longitudinal displacement by means of an inner sleeve 74 spanning the distance between the adjacent faces of the collar 73 and end plate 72, and held spaced from the mandrel 28 by shoulders 75 and 76, respectively, on the collar 73 and end plate 72. The inner sleeve 74 also prevents the inward buckling of the spring 23 against the mandrel 28.

The collar 73, when disengaged from the trunnion 19, may be rotated to tighten the spring 23 by means of the mandrel 28 which is splined by a key 77 directly to the collar 73. The mandrel 28 is, however, slidable longitudinally of the collar 73 and is enlarged at its inner end to form a clutch plate 78, which slides within a recess 79 in the collar 73. The clutch plate 78 is urged towards the end of the trunnion 19 by means of a helical spring 80 confined between the face of the clutch plate 78 and a shoulder 81 projecting inwardly from the collar 73. The adjacent end of the trunnion 19 is provided with a number of saw-shaped clutch teeth 82, which engage similarly shaped teeth in the clutch plate 78, when the clutch plate 78 is urged to the trunnion 19 by means of the spring 80.

In tightening the spring 23, it is merely necessary to grip the cutter head 16 in a vise and rotate the mandrel 28 by inserting a rod through a transverse opening 83, or by other means, in a direction to cause the teeth of the clutch plate 78 to ride over the teeth 82, compressing the spring 80. When the proper relative rotation between the cutter head 16 and the mandrel 28 has been attained, and the mandrel is released, the spring 80 will immediately urge the clutch plate 78 into engagement with the teeth 82.

In this form of the device it is, of course, impracticable to wind the spring 23 after the cutter has been placed in its intended position in the tube to be cut. In winding the spring 23, the trunnion 19 and eccentric 17 are held from movement relative to the cutter head 16. To this end, instead of the small trunnion 18 of Fig. 1, the end of the eccentric 17, opposite the trunnion 19, is provided with an enlarged trunnion 84 journaled in the cutter head 16, and having a cylindrical shoulder portion 85 of decreased diameter. The shoulder 85 is provided with a notch 86 which may be engaged by a dog 87 pivoted by a pin 88, in a recess 89, in the cutter head 16. The dog 87 is normally urged by means of a spring 90 to cause it to engage the notch 86, and thus hold the trunnion 84, eccentric 17 and trunnion 19 from rotating relative to the cutter head 16 while the mandrel 28 is rotating. When the proper tension has been placed on the spring 23, the sleeve 20 and cutter head 16 are inserted, sleeve foremost, into the tube to be cut. The position of the sleeve 20 and cutter head 16 is gauged by means of a loose ring 91 clamped by means of a set screw 92 at the desired position on the cutter head 16, so that it will rest at the edge of the tube when the cutter 10 is at its proper position. The eccentric 17 is then released by pressing the dog 87 against the tension of the spring 90, to release the notch 86, whereupon the eccentric is rotated until the cutter 10 contacts with the inner surface of the tube and is held against the tube by the tension of the spring 23.

The cutters 10 and the cutter head 16 are rotated from a driving universal head 93 which is connected to a driven head 95 by a driving pin 94 extending through a flat or longitudinally widened slot in the head 95, which is connected integrally with the shoulder 85 by means of a short neck 96. As the heads 93 and 95 rotate, the rotational movement is transmitted to the trunnions 84 and 19, causing the eccentric 17 to rotate. The spring 23 and the reaction of the cutter 10 on the inner surface of the tube, however, holds the cutter 10 and cutter head 16 in the same relation as would be the case if the cutter head 16 were driven.

In the event that it should be desired to remove the cutter before the tube has been completely severed, it will be necessary to release the tension of the spring 23. This can be done by disengaging the clutch plate 78 from the clutch teeth 82. To enable this to be done when the exposed end of the mandrel 28 cannot be reached from the outside end of a tube, a push rod 97 is mounted axially in an axial recess extending from the neck 96 through the shoulder 85, trunnion 83, eccentric 17 and trunnion 19 to the clutch plate 78. A transverse opening 98 in the neck 96 gives access to the end of the push rod 97 and enables it to be displaced longitudinally against the clutch plate 78 and the action of the spring 80, until the clutch plate 78 is disengaged from the clutch teeth 82, and the collar 73 and mandrel 28 may freely rotate until the tension of the spring 23 is released.

This form of cutter may be adapted for use as a straight or directly driven cutter, in the same manner as in the modification shown in Figs. 1, 2 and 3. In this case, the driving head 93 and pin 94 are removed and the plate 72 is replaced by a plate secured to the sleeve 20 and permitting an extension of the sleeve 20 to be threaded to the internally threaded end of the sleeve 20. An extension is also fitted to the mandrel 28 and pinned through the transverse opening 83, this extension of the mandrel being suitably journaled in the extension of the sleeve 20. The cutter may then be driven either through the extension of the mandrel or the extension of the sleeve 20, in the same manner as in the case of the modification shown in Figs. 1, 2 and 3. As thus adapted, the clutch 32, shown in Fig. 1, may be omitted, as the same function is accomplished by the clutch plate 78.

Figure 7:
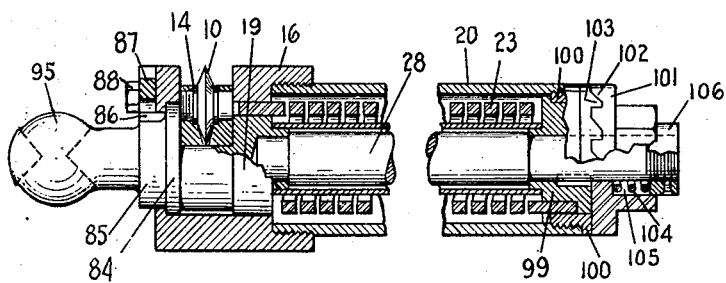
Fig. 7 is a longitudinal sectional view taken similarly to that of Fig. 5, of a modified form of the cutter for cutting tubes out of alignment with the cutter driving mechanism.

In the modification shown in Fig. 7, the cutter may be driven through a universal head 95 similar to that of Figs. 5 and 6, having a corresponding engaging dog 87, notch 86, shoulder 85 and trunnion 84. In this form of the device, however, the spring 23 is anchored directly to the trunnion 19, and the opposite end of the spring is anchored to a rotatable disc 99 at the outside end of the sleeve 20, and secured in place by a collar 100 threaded into the end of the sleeve 20. In tightening the spring 23 in this form of the device, the rotatable disc 99 is rotated from the mandrel 28 to which it is directly splined. The mandrel 28 is rotated relatively to the sleeve 20, by means of a clutch plate 101 which is slidably splined to the mandrel 28 and is provided with saw-shaped teeth 102 which engage complementary teeth 103 on the fixed collar 100. The clutch plate 101 is urged towards engagement with the collar 100, by means of a spring 104 within a recess 105 in the clutch plate 101, and confined between an internal shoulder in the clutch plate and a collet 106 fastened to the projecting end of the mandrel 28. The spring 23 may, therefore, be tightened by rotating the clutch plate 101, which thereupon slides out of engagement with the collar 100 until the proper tension is reached, whereupon by releasing the clutch plate 101, it will be urged into engagement with the collar 100 and locked in position relative to the sleeve 20. The cutter is inserted in the tube and the dog 87 is released in the manner described in connection with Figs. 5 and 6.

To use the cutter as a straight cutter, driven from the opposite end, the universal head 93 is removed and the mandrel 28 is replaced with one of the required length, as in Fig. 1. The sleeve 20 is replaced with a longer sleeve, to the outer end of which the collar 100 and the clutch plate 101 may be secured or, the mandrel and sleeve may be replaced with one of the form shown in Fig. 1.

My invention, therefore, provides a tube cutter which can be used in tubes of small diameter and in narrow, obstructed positions. Through my invention, also, a continuous, steady pressure is automatically applied to the cutter disc, requiring no attention on the part of the operator and obviating all risk that the cutter disc may be forced too rapidly, or spasmodically, into the tube being cut.

As changes of construction could be made within the scope of my invention, it is intended that all matter contained in the above description or shown in the accompanying drawings shall be interpreted as illustrative and not in a limiting sense.

Having now described my invention, what I claim as new and desire to secure by Letters Patent is:

1. A tube cutter which comprises a cutter head to be positioned within a tube to be cut, a cutter disc mounted in said head, supporting rollers for said cutter head having spreading ridges in a common plane with said disc, and means for moving said cutter disc away from the axis of said head.

2. A tube cutter which comprises a cutter head to be positioned within a tube cutter, an eccentric in said cutter head, a cutter disc carriage engaging said eccentric and guided inwardly and outwardly in said cutter head, a cutter disc carried in said cutter disc carriage, a driving sleeve mounted on said cutter head, a spring within said sleeve connected to said eccentric, and a ratchet for rotating and holding the free end of said spring in said sleeve.

3. A tube cutter which comprises a cutter head to be positioned within a tube to be cut, an eccentric in said cutter head, said eccentric being journaled eccentrically of said cutter head, a cutter disc carriage engaging said eccentric and guided inwardly and outwardly in said cutter head, a cutter disc carried on said cutter disc carriage, a driving sleeve for said cutter head, a spring within said sleeve, means for connecting one end of said spring to said eccentric, and means for rotating and holding the other end of said spring in said sleeve.

4. A tube cutter which comprises a cutter head to be placed within a tube to be cut, means for rotatably supporting said head in the tube walls, a driving sleeve connected to said cutter head, an eccentric mounted in said cutter head, a cutter carriage slidably mounted in said cutter head and engaging said eccentric, a cutter disc on said carriage, a spring connected at one end to said eccentric, a mandrel connected to the opposite end of said spring, a clutch face on said sleeve, a clutch slidably mounted on said mandrel, and a spring urging said clutch to said clutch face.

5. A tube cutter which comprises a cutter head to be placed within a tube to be cut, spreading rollers for supporting said head in said tube walls, a driving sleeve connected to said cutter head, an eccentric mounted in said cutter head, a cutter carriage slidably mounted in said cutter head and engaging said eccentric, a cutter disc on said carriage, spreading ridges on said supporting rolls in the plane of said cutter disc, a spring connected at one end to said eccentric, a mandrel connected to the opposite end of said spring, a clutch face on said sleeve, a clutch slidably mounted on said mandrel, and a spring urging said clutch to said clutch face.

6. A tube cutter which comprises a cutter head to be placed within a tube to be cut, means for rotatably supporting said head in the tube walls, a driving sleeve connected to said cutter head, an eccentric mounted in said cutter head, a cutter carriage slidably mounted in said cutter head and engaging said eccentric, a cutter disc on said carriage, a mandrel extending through said sleeve, a spring connected at one end to said mandrel, a clutch between said eccentric and said spring, and means for rotating said clutch relative to said eccentric.

7. A tube cutter which comprises a cutter head to be placed within a tube to be cut, an eccentric mounted in said cutter head, a cutter carriage slidably mounted in said cutter head and engaging said eccentric, a cutter disc on said carriage, a spring confined between said cutter head and said eccentric, and means for releasing said spring connection between said head and said eccentric.

8. A tube cutter which comprises a cutter head to be placed within a tube to be cut, an eccentric mounted in said cutter head, a cutter carriage slidably mounted in said cutter head and engaging said eccentric, a cutter disc on said carriage, a spring confined between said cutter head and said eccentric, and releasable means for preventing rotation of said eccentric in said cutter head.

9. A tube cutter which comprises a cutter head to be placed within a tube to be cut, an eccentric mounted in said cutter head, a cutter carriage slidably mounted in said cutter head and engaging said eccentric, a cutter disc on said carriage, a spring confined between said cutter head and said eccentric, releasable means for preventing the rotation of said eccentric in said cutter head, and a universal joint connected directly to said eccentric.

10. A tube cutter which comprises a cutter head to be placed within a tube to be cut, an eccentric mounted in said cutter head, a cutter carriage slidably mounted in said cutter head and engaging said eccentric, a cutter disc on said carriage, a spring connected to said cutter head and stressed torsionally to said eccentric, driving means connected directly to said eccentric, a notch in the journals of said eccentric, and a spring-pressed retaining dog on said cutter head engaging said notch.

11. A tube cutter which comprises a cutter head to be positioned within a tube to be cut, an eccentric in said cutter head, a cutter disc carriage engaging said eccentric and guided inwardly and outwardly in said cutter head, a cutter disc mounted on said cutter disc carriage, a driving sleeve for said cutter head, a leaf spring within said sleeve connected at one end to said eccentric, and means for rotating and holding the other end of said spring in said sleeve.

In testimony whereof I affix my signature.

STANFIELD N. ARNOLD.